Jan. 29, 1952  T. M. GORDON, JR  2,583,941
DEVICE FOR DETECTING VARIATIONS IN FLUID PRESSURE
Filed Nov. 13, 1946
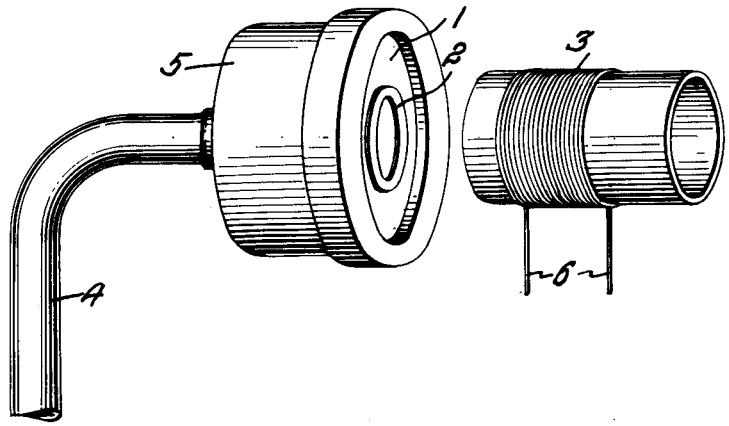
Fig. 1.
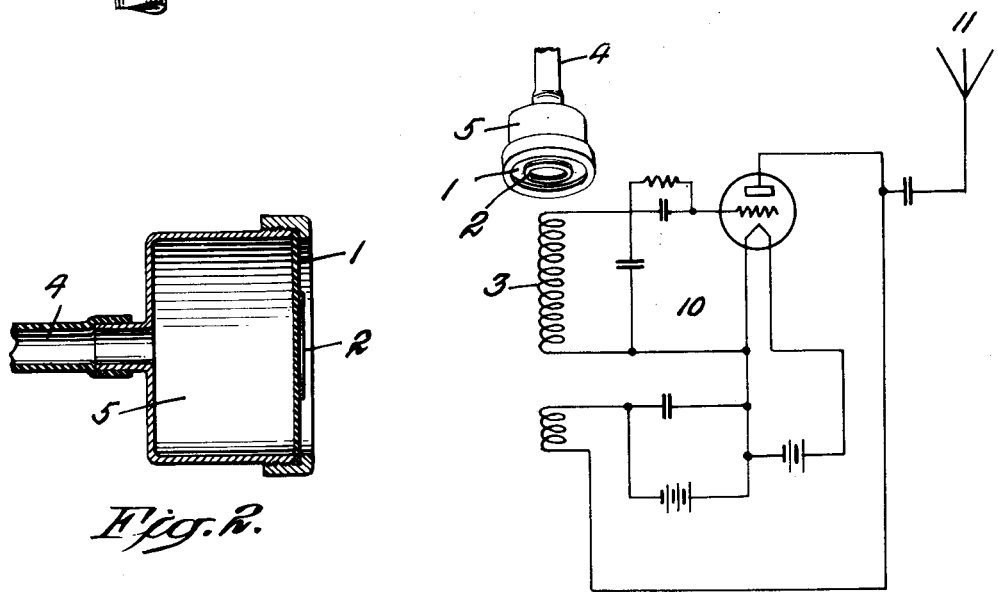
Fig. 2.
Fig. 3.
INVENTOR.
Thurlow M. Gordon, Jr
BY
Byerly, Watson & Simonds
ATTORNEYS Patented Jan. 29, 1952

2,583,941

UNITED STATES PATENT OFFICE 2,583,941

DEVICE FOR DETECTING VARIATIONS IN FLUID PRESSURE

Thurlow M. Gordon, Jr., New York, N. Y.

Application November 13, 1946, Serial No. 709,652

5 Claims. (Cl. 171—242)

This invention relates to a variable inductance pick-up. The invention aims to cause electrical variations corresponding to fluid pressure variations to facilitate the detection and recording or transmission of fluid pressure variations.

In accordance with the invention, the position of a closed loop or turn of conducting material in an electromagnetic field is influenced by variations in fluid pressure so that it causes corresponding variations in the electric current creating the field.

In order that my invention may clearly be understood, I will describe a specific illustrative device embodying it and explain some of the uses to which this device may be put. In this explanation, I shall refer to the accompanying drawings in which:

Fig. 1 is a perspective view and Fig. 2 a transverse section of the device embodying the invention; and Fig. 3 is a diagram of a frequency-modulated transmitter including the device of Figs. 1 and 2.

The device shown in Figs. 1 and 2 includes a fluid conduit 4 leading into a closed chamber 5. The conduit 4 is connected to the source of the fluid pressure whose variations are to be detected or transmitted. The conduit 4 and chamber 5 are filled with a fluid, either gaseous or liquid. One wall of the chamber 5 is a flexible diaphragm of dielectric material such as rubber or plastic. Secured to the outer face of the diaphragm I is a closed turn or ring of conducting material. The ring has a diameter considerably less than that of the diaphragm and is coaxial with the diaphragm. In order that the ring 2 may not damp or otherwise influence the vibrations of diaphragm I under the variations in pressure of the fluid in the chamber 5, the ring 2 is made very light. It is most desirably a ring of metal foil cemented to the diaphragm.

For the sake of clearness, its thickness is considerably exaggerated in the drawing.

In front of the diaphragm I is a coil of wire 3 having terminals 6 connected to a source of electric current. The ring 2 lies in the magnetic field created by the coil 3. Its position in this field is varied by the vibration or other movement of the diaphragm caused by the variations in the pressure of the fluid in the chamber 5. This causes changes in the inductance of the electric circuit between the terminals 6, which correspond to the changes in the position of the ring and, therefore, to the variations in the fluid pressure. Since slight changes in the inductance of the electric circuit may easily be detected and utilized in many ways familiar to those skilled in the art, the device provides a very sensitive means for detecting and recording or otherwise utilizing variations in fluid pressure.

The new device is susceptible of use for many purposes and as a part of many different kinds of instruments. In order to illustrate its utility, I will describe an instrument in which it is now being used to advantage:

In certain biological work, it is desirable to make a record of the heart action or pulse of a person or animal who is moving about. An instrument for this purpose is shown diagrammatically in Fig. 3. In this case, the conduit 4 leading to the chamber 5 is the tube of a stethoscope which is attached to the person or animal in such a manner that the pressure variations in the chamber 5 correspond to the pulse or heart beat. The coil 3 is connected as the tank coil of a conventional electronic oscillator 10, so that the variations of pressure in the chamber 5 corresponding to the heart beats cause variations in the frequency of the oscillator. The oscillator is made of small dimensions so that it may be strapped to the person or animal forming the subject of experiment. The oscillator is connected through a condenser to a small loop or antenna 11 so that it serves as an FM transmitter. While the person or animal under test is moving about, the radiations may be received at a fixed receiver and suitably recorded by known means.

The device may be used for many other purposes, for example, for producing frequency modulation corresponding to fluid pressure variation produced by the voice or by other sound.

What I claim is:

1. A device for causing electric variations corresponding to variations in fluid pressure, comprising the combination with an electric circuit formed to create an electromagnetic field providing inductance in said circuit, of a flexible diaphragm of dielectric material subject to the variations in fluid pressure and located in the electromagnetic field, and a thin flat ring of electro-conducting material secured on one face of the diaphragm.

2. A device for causing electric variations corresponding to variations in fluid pressure, comprising a fluid container, a flexible diaphragm of dielectric material forming part of the wall of the container, a thin flat ring of electro-conducting material having a diameter less than that of the diaphragm and secured on one face of the diaphragm, and a fixed inductance coil located near said face of the diaphragm and having a magnetic field in which said ring is located.

3. A device for causing electric variations corresponding to variations in fluid pressure, comprising a fluid container, a flexible diaphragm of dielectric material forming part of the wall of the container, a circular ring of electro-conducting metal foil having a diameter less than that of the diaphragm and attached on the outer face of the diaphragm with its axis coincident with that of the diaphragm, and a fixed inductance coil located in front of the diaphragm with its axis coincident with the axes of the ring and diaphragm.

4. A device for causing electric variations corresponding to variations in fluid pressure, comprising the combination with an electric circuit formed to create an electromagnetic field providing inductance in said circuit, of a flexible diaphragm of dielectric material subject to the variations in fluid pressure and located in the electromagnetic field, and means operative on vibration of the diaphragm under variations in the fluid pressure for changing the inductance of the circuit without damping the vibrations of the diaphragm and consisting of a very light closed electric conductor secured on one face of the diaphragm.

5. A variable inductance pick-up for translating mechanical vibrations into electrical vibrations without distortion, comprising the combination with an electric circuit formed to create an electromagnetic field providing inductance in said circuit, a mechanically vibrated member of dielectric material located in the electromagnetic field, and means operative on vibration of said member for changing the inductance of the circuit without damping the vibrations of the member and consisting of a substantially inertialess closed electric conductor secured to the member.

THURLOW M. GORDON, Jr.

REFERENCES CITED

The following references are of record in the file of this patent:

UNITED STATES PATENTS

| Number | Name | Date |
|---|---|---|
| 771,917 | DeMoura | Oct. 11, 1904 |
| 1,375,707 | King | Apr. 26, 1921 |
| 1,571,405 | Goldsmith | Feb. 2, 1926 |
| 1,718,494 | Schurig | June 25, 1929 |
| 2,026,758 | Turner | Jan. 7, 1936 |
| 2,143,298 | Boucke | Jan. 10, 1939 |
| 2,174,701 | Koch | Oct. 3, 1939 |
| 2,294,015 | Salb et al. | Aug. 25, 1942 |
| 2,353,162 | Kaltenbacher | July 11, 1944 |
| 2,366,639 | Moore | Jan. 2, 1945 |
| 2,415,310 | Summerville | Feb. 4, 1947 |
| 2,441,354 | Gould | May 11, 1948 |
| 2,441,464 | Albright | May 11, 1948 |
| 2,444,218 | Carnahan | June 29, 1948 |
| 2,459,155 | Erickson | Jan. 18, 1949 |